United States Patent
Lee et al.

(10) Patent No.: US 8,891,475 B2
(45) Date of Patent: Nov. 18, 2014

(54) WLAN SERVICE METHOD AND WLAN SYSTEM

(71) Applicant: SNU R&DB Foundation, Seoul (KR)

(72) Inventors: Su Chul Lee, Seoul (KR); Chong Kwon Kim, Seoul (KR)

(73) Assignee: SNU R&DB Foundation, Seoul (KR)

(*) Notice: Subject to any disclaimer, the term of this patent is extended or adjusted under 35 U.S.C. 154(b) by 90 days.

(21) Appl. No.: 13/735,917

(22) Filed: Jan. 7, 2013

(65) Prior Publication Data

US 2014/0119291 A1    May 1, 2014

(30) Foreign Application Priority Data

Oct. 25, 2012  (KR) .................. 10-2012-0119136

(51) Int. Cl.
| | |
|---|---|
| H04W 4/00 | (2009.01) |
| H04W 72/04 | (2009.01) |
| H04W 24/00 | (2009.01) |
| H04W 84/12 | (2009.01) |
| H04W 74/08 | (2009.01) |
| H04W 28/06 | (2009.01) |

(52) U.S. Cl.
CPC .............. *H04W 24/00* (2013.01); *H04W 84/12* (2013.01); *H04W 74/08* (2013.01); *H04W 72/0406* (2013.01); *H04W 28/06* (2013.01)
USPC ............................ 370/329; 370/338; 370/341

(58) Field of Classification Search
None
See application file for complete search history.

(56) References Cited

U.S. PATENT DOCUMENTS

| | | | | |
|---|---|---|---|---|
| 2008/0232490 | A1* | 9/2008 | Gross et al. | 375/260 |
| 2010/0061474 | A1* | 3/2010 | Razzell | 375/260 |
| 2010/0290425 | A1* | 11/2010 | Hadad | 370/330 |
| 2011/0043407 | A1* | 2/2011 | Moshfeghi | 342/394 |
| 2012/0087436 | A1* | 4/2012 | Srinivasa et al. | 375/295 |
| 2013/0094440 | A1* | 4/2013 | Moshfeghi | 370/328 |
| 2013/0184002 | A1* | 7/2013 | Moshfeghi | 455/456.1 |

OTHER PUBLICATIONS

Andrei Broder et al., "Network Applications of Bloom Filters: A Survery", Internet Mathematics, Jun. 2005, pp. 485-509, vol. I, No. 4, A K Peters, Ltd.

* cited by examiner

*Primary Examiner* — Chi Pham
*Assistant Examiner* — Soon-Dong D Hyun

(57) ABSTRACT

Provided is a method for WLAN service performed by an access point (AP) in a WLAN system including the AP and a plurality of stations (STAs) each of which can associate with the AP, the method comprising: dividing frequency bandwidth of available channel into a plurality of frequency-selective subchannels; receiving, from at least some STAs (first STAs) among the plurality of STAs, CRQ (Contention Resolution reQuest) frame including a signature of the first STAs through at least some of the subchannels, the signature identifying the first STAs; identifying the first STAs using the received CRQ frame; estimating uplink channel quality of the first STAs using the received CRQ frame; allocating subchannels for each of the first STAs; and broadcasting result of subchannel allocation using CRP (Contention Resolution rePly) frame.

16 Claims, 9 Drawing Sheets

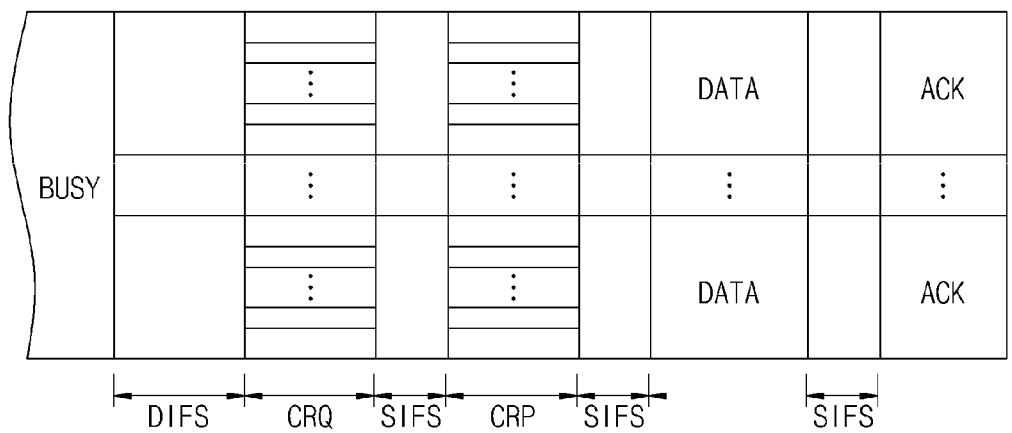

```
Algorithm 1 Multi channel backoff
  for i := requested subchannel i ∈ C do
    if subchannel i is requested & allocated then
      Pr(i) ← Pr(i)+α
    else if subchannel i is requested & not allocated then
      Pr(i) ← Pr(i)/β
    end if
  end for
  Pr(i) ← Pr(i) X  K / Σ_{j∈C}Pr(j) , ∀ i∈C
```

WLAN SERVICE METHOD AND WLAN SYSTEM

CROSS-REFERENCE TO RELATED APPLICATIONS

This application claims priority under 35 U.S.C. §119 to Korean Patent Application No. 10-2012-0119136, filed on Oct. 25, 2012, in the Korean Intellectual Property Office, the disclosure of which is incorporated herein by reference in its entirety.

TECHNICAL FIELD

The present invention relates to a WLAN service method and WLAN system, and more particularly, to a WLAN system using diversity with decreased overhead and MAC/PHY layer communication method thereof.

BACKGROUND

Frequency diversity is one of the characteristics that should be considered in designing wireless communication systems, especially for ones that operate over a wide frequency band such as WiMAX and 3GPP LTE. In addition to spatial and temporal diversities, signals transmitted over a wide frequency band experience independent fluctuations across frequencies. This phenomenon is generally called "frequency selective fading." Frequency diversity is ignored in conventional WiFi systems because these systems use a channel as a whole. However, adoption of OFDM in 802.11 WLANs triggered recent research interests in harvesting gains from frequency diversity. The importance of frequency diversity research becomes more important than ever as IEEE 802.11 working group (WG) is standardizing the use of wider channels. For example, 802.11n can already use a 40 MHz channel by Phased Coexistence Operation (PCO) and 802.11ac will provide up to a 160 MHz channel. Accordingly, several Wi-Fi protocols exploiting frequency diversity have already been proposed recently in academia.

To harness frequency diversity, a wireless communication system must provide channel quality estimation functionality.

Acquiring channel quality information consumes time and frequency resource that ideally should be used for data transfer. For example, many current wireless systems estimate channel quality using a training sequence (pilot) in a preamble or spend dedicated time only for the channel estimation purpose. Moreover, for N by N Multiple-Input-Multiple-Output (MIMO) systems, $N^2$ channels have to be estimated resulting in substantial protocol inefficiency. In this case, the high data throughput of a MIMO system cannot be achieved due to the large overhead of channel estimation. In short, there is a trade-off between frequency diversity gains and protocol efficiency.

The research approaches to achieve frequency diversity gains are categorized into two groups; (i) variants of Wi-Fi systems that improve the protocol efficiency and (ii) frequency diversity aware protocols for various wireless networks such as WiMAX, 3GPP LTE, and Wi-Fi networks. However, none of them explore both of the conflicting objectives—i.e., reduction of channel estimation overhead and protocol efficiency—simultaneously. Most previous work emphasizes mainly one side of these since the two objectives are considered as orthogonal to each other (but it is not true as we have discussed above). Also, frequency diversity aware studies are highly theoretical rather than practical, i.e., these researchers solved the channel allocation problem assuming the perfect channel information is given.

SUMMARY

According to the present disclosure, satisfying two conflict objectives, achieving frequency diversity gain and protocol efficiency, boils down to acquisition of channel quality information with a minimum channel estimation cost. In this disclosure, we present a WLAN system we call diversity-aware Wi-Fi (D-Fi), a novel Wi-Fi PHY/MAC protocol that exploits frequency diversity while sustaining protocol efficiency. Specifically, D-Fi collects channel information while resolving channel contentions using an OFDM-based Bloom filter without requiring a dedicated channel estimation mechanism. D-Fi can be combined with other protocols because it is orthogonal to those existing Wi-Fi proposals custom-tailored for improving protocol efficiency.

An exemplary embodiment of the present invention provides a method for providing WLAN service performed by an access point (AP) in a WLAN system including the AP and a plurality of stations (STAs) each of which can associate with the AP, the method comprising: dividing frequency bandwidth of available channel into a plurality of frequency-selective subchannels; receiving, from at least some STAs (first STAs) among the plurality of STAs, CRQ (Contention Resolution reQuest) frame including a signature of the first STAs through at least some of the subchannels, the signature identifying the first STAs; identifying the first STAs using the received CRQ frame; estimating uplink channel quality of the first STAs using the received CRQ frame; allocating subchannels for each of the first STAs; and broadcasting result of subchannel allocation using CRP (Contention Resolution rePly) frame.

It is preferable that the subchannel has a bandwidth equal to or less than minimum coherence bandwidth, or equal to or less than 3 MHz.

The number of the subchannels may be 14.

The signature may be a binary bit sequence of 16 bits, and each of the STAs may receive a unique signature at the time of association with the AP.

The AP may receive synthesized signal of the signatures of the first STAs trying to use the subchannel for each subchannel, and the signature may be modulated on K (K is a natural number) subchannels selected by each of the first STAs according to likelihood of good channel quality.

Each of the first STAs may select the subchannels using the following algorithm 1.

Algorithm 1 Multi channel backoff

```
for i := requested subchannel i ∈ C do
    if subchannel i is requested & allocated then
        Pr(i) ← Pr(i) + α
    else if subchannel i is requested & not allocated then
        Pr(i) ← Pr(i)/β
    end if
end for
Pr(i) ← Pr(i) X K/∑_{j∈C} Pr(j), ∀ i ∈ C
```

It is preferable that the AP identifies the first STAs using a Bloom filter and the Bloom filter is implemented through subcarrier-level signaling in OFDM system.

The AP may estimate the uplink channel quality by measuring energy of a unique bit, which is transmitted by one STA only, included in the received CRQ frame.

The broadcasting may be broadcasting the CRP frame including data rate information.

The AP may identify the first STAs using Machine Learning (ML) algorithm, preferably, and an ML model used in the ML algorithm may be trained when a STA joins or leaves the AP.

Another exemplary embodiment of the present invention provides a WLAN system comprising: an access point (AP); and a plurality of stations (STAs) each of which can associate with the AP, wherein a channel available in the WLAN system is divided into a plurality of frequency-selective subchannels; at least some STAs (first STAs) among the plurality of STAs transmit a CRQ (Contention Resolution reQuest) frame including a signature of the first STAs through at least some of the subchannels, the signature identifying the first STAs; and the AP identifies the first STAs using the received CRQ frame, estimates uplink channel quality of the first STAs using the received CRQ frame, allocates subchannels for each of the first STAs, and broadcasts result of subchannel allocation using CRP (Contention Resolution rePly) frame.

The first STAs may transmit the CRQ frames simultaneously when the channel is idle for more than DIFS (DCF Inter-Frame Space).

Other features and aspects will be apparent from the following detailed description, the drawings, and the claims.

BRIEF DESCRIPTION OF THE DRAWINGS

FIG. 1 shows MAC (Media Access Control) protocol overview of a WLAN system according to an exemplary embodiment of the present invention.

FIG. 2 is a description for two Bloom filter based operations; inserting elements, i.e., signatures (CRQ) and testing membership (CRQ decoding).

DETAILED DESCRIPTION OF EMBODIMENTS

Figure 3:
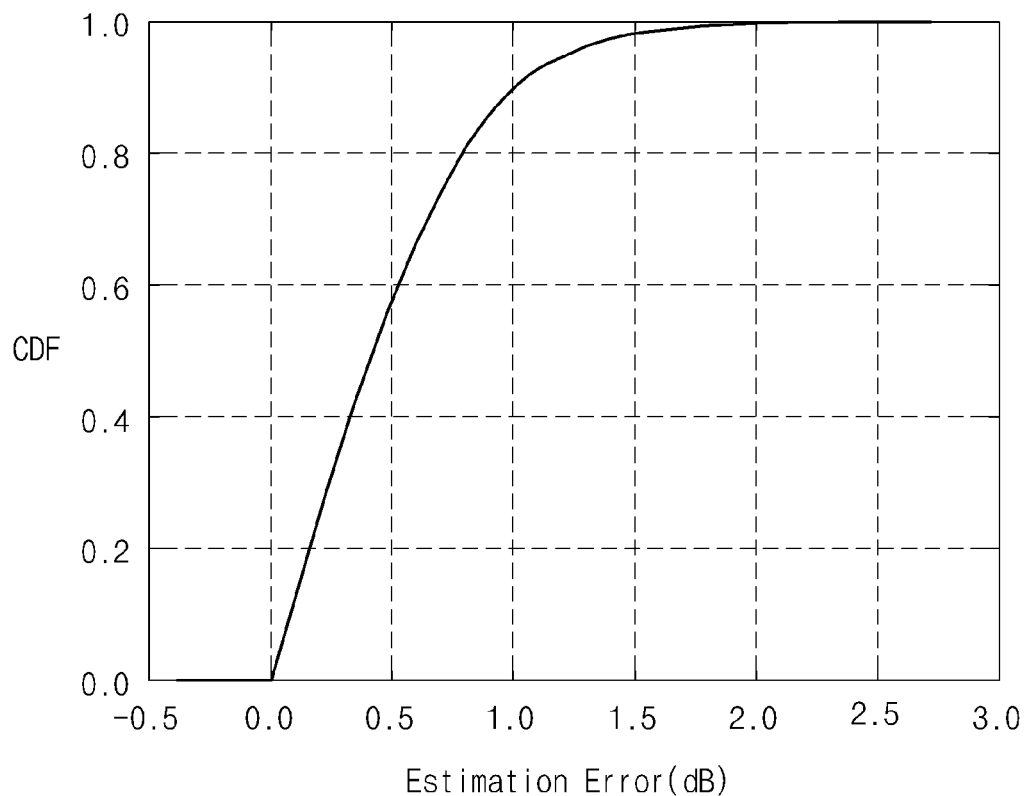
FIG. 3 shows the empirical CDF for the estimation error of a WLAN system according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Now, a WLAN system and PHY/MAC layer communication method thereof according to an exemplary embodiment of the present invention is described with reference to accompanying drawings.

I. Introduction

The D-Fi protocol has the following features.

D-Fi channelizes a Wi-Fi band into several orthogonal subchannels based on the OFDM technique and uses each of them as a channel access unit. This channelized medium access amortizes MAC coordination burdens and hence improves overall MAC protocol efficiency. Moreover, it exploits frequency diversity inherent in a wide band by a frequency-aware subchannel allocation scheme.

D-Fi estimates channel quality while performing contention based channel allocation. To do so, D-Fi adopts a Bloom filter based channel contention mechanism. Specifically, the D-Fi MAC protocol uses RTS/CTS-like Collision Resolution reQuest (CRQ)/Collision Resolution rePly (CRP) frames through a Bloom filter. A CRQ/CRP frame lasts only for a few OFDM symbols. The overhead of D-Fi is much smaller than that of the legacy RTS/CTS frame. Multiple stations (STAs) contend for subchannels simultaneously according to estimated subchannel quality as well as their traffic demands. An AP can estimate the uplink channel quality of the STAs using this synthesized CRQ frame without additional channel estimation overhead. After an AP perform frequency aware subchannel allocation based on the channel estimates then it broadcasts a CRP frame to inform the STAs of the result of channel allocation.

Bloom filter based channel contention incurs the ambiguity problem because of an intrinsic characteristic of a Bloom filter. D-Fi uses two methods to solve the problem. Firstly, an analysis-based multi channel backoff algorithm reduces the occurrence of the ambiguity while allowing DFi STAs to distributively explore/exploit frequency diversity. Next, applying machine learning (ML) algorithms to the D-Fi protocol resolves the ambiguity so that D-Fi can operate the MAC protocol reliably.

We implemented the OFDM-based D-Fi PHY/MAC on a testbed consists of four USRPs/GNUradios. The experiment shows the feasibility and practicality of the D-Fi PHY/MAC protocol. Further, we used detailed trace-driven simulation to evaluate the performance of D-Fi. Our results show that D-Fi has up to 3× and 1.5× better performance in terms of throughput compared to existing 802.11n and FICA (K. Tan, J. Fang, Y. Zhang, S. Chen, L. Shi, J. Zhang, and Y. Zhang. Finegrained Channel Access in Wireless LAN. In ACM SIGCOMM 2010), respectively.

In summary, this disclosure makes the following contributions. (i) We design and implement D-Fi, a Wi-Fi PHY/MAC protocol that exploits frequency diversity while sustaining the MAC efficiency. (ii) We provide a detailed analysis to address the ambiguity problem arisen from the use of a Bloom filter. Based on the analysis we propose a multi channel backoff algorithm that explores/exploits frequency diversity distributively while reducing the occurrence of ambiguity. (iii) We apply ML methods to the D-Fi PHY/MAC protocol and demonstrate the superior performance of ML methods in solving the ambiguity problem arisen in the D-Fi PHY/MAC protocol. (iv) We demonstrate the feasibility of D-Fi with our prototype implementation on the USRP/GNURadio platform and evaluate its performance using the detailed trace-driven simulation.

II. D-FI Design

D-Fi is a CSMA-based Wi-Fi PHY/MAC protocol that performs wireless channel contention and channel quality estimation at the same time. Generally, channel quality estimation incurs overhead because extra estimation time and/or training sequences (pilot) are used for estimation. D-Fi acquires channel information while STAs are performing channel contention and no additional overheads are required. Based on the estimated channel quality, D-Fi exploits frequency diversity. In this section, we detail the design of the D-Fi PHY/MAC.

A. Channelization

Taking a large Fast Fourier Transform (FFT) window size means a long OFDM data symbol in time. Therefore, for the purpose of good protocol efficiency, it is desirable to choose a large FFT window. Although it is possible to choose any large FFT size theoretically, there are several practical concerns that prevent large FFT [4]: (i) Computational complexity increases as an FFT size increases since the theory tells us that the complexity of the N-points FFT (or inverse FFT) is $O(N \log N)$. (ii) The frequency separation between subcarriers is imperfect. These limitations are generally caused by mismatched oscillators, Doppler shift, or timing synchronization errors. And these factors eventually lead to lose orthogonality between subcarriers introducing non-negligible inter carrier interference (ICI) in practice. In D-Fi, to deal with such limitations, we choose the FFT size such that an OFDM symbol is 256/512 points in a 20/40 MHz channel (subcarrier bandwidth is about 78.12 KHz.).

Coherence bandwidth is a statistical measure of the range of frequencies over which the channel can be considered "flat". Recent measurement studies have shown that the minimum coherence bandwidth over the industrial, scientific, and medical (ISM) license-free band (near 2.4/5 GHz) is approximately 3 MHz in indoor environments. Therefore, when a channel access unit (i.e., a subchannel) is narrower than 3 MHz it can be considered as flat within a subchannel and is frequency-selective between subchannels.

These measurement results motivate us to develop D-Fi, a Wi-Fi protocol that exploits frequency-selectivity. We choose 17 contiguous subcarriers to form a subchannel (bandwidth is about 1.4 MHz.). Among 17 subcarriers, 16 subcarriers are used for data transmission and one subcarrier is used as a pilot channel that tracks the subchannel quality while the data is being transferred. There are 14 orthogonal subchannels in a 20 MHz band, and they are frequency-selective one another in typical indoor environments.

B. Protocol Overview

FIG. 1 shows MAC (Media Access Control) protocol overview of a WLAN system according to an exemplary embodiment of the present invention.

D-Fi uses Contention Resolution reQuest (CRQ)/Contention Resolution rePly (CRP) frame exchanges for channel contention as shown in FIG. 1. Note that a CRQ/CRP frame lasts only for a few OFDM symbols and so its overhead is much smaller than that of the legacy RTS/CTS frame. If the medium is idle for more than distributed interface space (DIFS) STAs may transmit CRQ symbols simultaneously. Each STA selects K subchannels (They are not necessary to be continuous) likely to have good channel quality and modulates his own signature on each selected subchannel. Consequently, multiple CRQs sent from multiple STAs arrive at the AP. These CRQ symbols can be misaligned due to different propagation delay, sensing time (CCA), and RF RxTx switching delay. However the total misalignment has been shown to be tightly bounded [10]. In an OFDM system, as long as the misalignment is less than the cyclic prefix (CP), a receiver can decode misaligned signals [4]. We set the D-Fi CP length such that the maximum alignment is less than CP length.

An AP can extract STAs' uplink channel quality information from CRQ frames. Then the AP allocates subchannels to the STAs based on any channel allocation policy, for example, proportional fairness or throughput-optimum.

To inform STAs of the channel allocation results, the AP broadcasts a CRP frame. This frame conveys the signature of the contention winner and transmission rates for future data transmission.

C. Channel Contention and Estimation

1) Signature:

A signature is a binary bit sequence of 16 bits. A STA receives a unique signature when it joins a Wi-Fi network. The rule for assigning a signature is as follows: First, divide a 16 binary bits sequence into four continuous-bits subsequences. Then choose one bit in each subsequence and mark chosen four bits (one bit from each subsequence) as "1" and the rest as "0". Therefore, 256 (=$4^4$) possible signatures exist. Note that the number of STAs in a WLAN is typically not very large (order of tens and 256 is enough for unique allocation to all STAs).

A signature is carried over one subchannel; one bit over one subcarrier. We use binary amplitude modulation (BAM) to modulate a single bit on each subchannel. Specifically, BAM uses On-Off signaling that maps a binary "0" to zero amplitude and a binary "1" to a random complex number on the unit circle (ej) in a subcarrier. In other words, no signal is transmitted to modulate a binary "0" in a subcarrier and a fixed powered random complex signal is transmitted to modulate a binary "1" in a subcarrier. A receiver can easily detect a BAM symbol by measuring a signal power level on a subcarrier without demodulating an exact symbol.

STAs may join and leave dynamically. At the time of association, an AP allocates a signature to the joining STA. The allocated signatures among 256 possible ones are called "valid". If a STA is inactive for long time, its signature is taken back and set to be "invalid".

2) CRQ Frame:

To facilitate simultaneous channel contention and estimation, D-Fi uses the Bloom filter. A subchannel where signatures are transmitted can be considered as a Bloom filter consists of 16 bits. If only one signature is transmitted over a subchannel, then we can easily detect the signature. If two or more signatures collide, the AP uses the Bloom filter technique to resolve signatures. The process of identifying signatures from a Bloom filter is called "CRQ decoding" (FIG. 2).

FIG. 2 is a description for two Bloom filter based operations; inserting elements, i.e., signatures (CRQ) and testing membership (CRQ decoding). These operations are performed in one subchannel (i.e., one Bloom filter). Broadcast of a channel contention result (CRP) is also described at the bottom of the figure.

In CRQ decoding, we should handle two types of ambiguity; the physical and logical errors.

Physical errors.

One bit in a Bloom filter is actually one OFDM subcarrier. A STA will transmit a signal over some selected subcarriers representing its signature. Since the frequency separation between subcarriers is imperfect in practice a subcarrier suffers from so-called "spectral leakage." A signal spills over adjacent subcarriers. Since subcarrier-level signal detection is implemented by comparing between a signal power level and a threshold, the signal can be falsely detected. We call this event "bitwise false positive (bitwise-FP)" and the event that the signal is falsely missed "bitwise false negative (bitwise-FN)". Both of the events are the physical errors. Careful and adaptive threshold adjustments can make them negligible. Our software radio implementation (explained in section V) as well as other implementations showed that the physical error rates are quite small.

Logical errors.

An intrinsic characteristic of a Bloom filter is the logical error. During the CRQ decoding process, an AP falsely determines the signatures that are not actually requested. It is generally called "False Positive (FP)" of a Bloom filter. For example, two stations STA1 and STA2, whose signatures are "1000 1000 0010 0001" and "1000 1000 0001 0010", respectively, request to the same subchannel resulting in a Bloom filter of "1000 1000 0011 0011". The AP should decode "1000 1000 0011 0011" as a superposition of the signatures of STA1 and STA2. However, due to the inherent ambiguity, it may falsely decode it as "1000 1000 0001 0001" and "1000 1000 0010 0010 as well. Although D-Fi only considers STAs having valid signatures as channel contenders, there still is non-negligible FP rate.

We propose two methods to solve the ambiguity problem; an analysis based multi channel backoff algorithm and machine learning (ML) algorithms. The analysis based multi channel backoff algorithm aims to limit the number of channel requests for one subchannel. On average a STA will request K subchannels at once, and an appropriate value of K is determined by the analysis shown in section III. The multi channel backoff algorithm selects K preferable (i.e., high quality) subchannels in a distributed manner to exploit frequency diversity. On the other hand, ML-based CRQ decoding aims to reduce the probability of logical and physical errors in CRQ decoding (explained in section IV). In short, multi channel backoff prevents the logical errors while ML-based CRQ decoding corrects the physical and logical errors.

3) CRP Frame:

To inform a STA of a channel allocation result, an AP broadcasts a CRP frame. This frame conveys the signature of a contention winner and data rate information for future data transmission for each subchannel. Since there are 256($=2^8$) signatures, 8 bits are used for a signature and the rest are used for data rate information (FIG. 2).

4) Channel Quality Estimation:

Assume that all stations use the same transmission power and the total transmission energy spreads evenly over each of four bits marked as "1" when sending a CRQ symbol. An AP can guess the channel qualities from the signal strength of unique bits. A unique bit is a bit that is transmitted by one station only. After CRQ decoding, we determine unique bits and use the average energy level of the unique bits belong to a signature as the channel quality (FIG. 2).

We have evaluated the channel estimation performance in terms of accuracy in our implementation. FIG. 3 shows the empirical CDF for the estimation error of our method. As shown in FIG. 3, the estimation error of our method is less than or equal to 1 dB for most of the cases (90%).

D. Proportional Fairness

Once channel quality estimates are available, an AP can allocate subchannels to STAs by the proportional fairness algorithm. Proportional fairness maximizes the sum of logarithmic throughput over the fixed number (W) of time slots. Let $T_i[n]$ be the throughput of a STA i in a time slot n, the throughput of a STA i during W time slots $T_i^{(W)}[n]$ is then:

$$T_i^{(W)}[n] = \frac{1}{W} \sum_{m=n-n_0}^{n+W-n_0-1} T_i[m] \quad (1)$$

where $n_0$ is the number of slots look back to the past, and $W-n_0-1$ is the number of slots in the future. With the equation (1), our objective function is written as:

$$\max \sum_i \log T_i^{(W)}[n] \quad (2)$$

By the Shannon's theorem, the throughput can be further re-written as a function of estimated SNRs. The difference from the original problem is that we apply the proportional fairness algorithm to the reduced problem space since an AP can only estimate the channel quality of the STAs who have made a request. Even with this restriction, in subsection V-B, we will show that D-Fi has close to the optimal performance in terms of exploring/exploiting frequency diversity.

E. Why Bloom Filter?

Basically, a Bloom filter is a space-efficient data structure. Here, the space means the number of subcarriers constructing a subchannel. As we have described above, we cannot use large FFT windows. The price paid for this space-efficiency is probabilistic ambiguity inherent to a Bloom filter: it tells us that the element either definitely is not in the set or may be in the set. The term "may" means that a Bloom filter may generate ambiguity (i.e., false positives). In D-Fi, resolution of the ambiguity is particularly important because it estimates the channel quality based on the unique bits in signatures. Unfortunately, it is impossible to eliminate false positives completely and hence we turn our attention to find a method to mitigate the false positive probability. As we will see afterwards, machine learning algorithms (MLs) are good solutions to this problem.

III. Analysis

In this section, we analyze the false positive probability and the collision probability of the contention mechanism in D-Fi. Based on the analysis we propose a multi channel backoff method that enables a STA to explore/exploit frequency diversity distributively. It also reduces the false positive probability of the Bloom filter based contention mechanism.

We assume a WLAN consists of N STAs and C subchannels. As a Bloom filter is used for each subchannel C Bloom filters exist. A Bloom filter consists of m binary bits (i.e., subcarriers)

$$r\left(=\frac{N \times K}{C}\right)$$

and h hash functions (Each bit of a signature is chosen by each hash function). A STA can request for K subchannels each time it contends for a channel. On average, STAs will select a certain subchannel. In other words, on average, r elements (signatures) will be inserted into a Bloom filter. Given that hash functions are uniform, the probability that a certain bit is selected by one of h hash functions is h/m.

Let us derive the probability that a subcarrier is set to be "1" taking into account the spectral leakage. An OFDM system suffers from high spectral sidelobes, and consequently, a subcarrier may accidentally be set to "1" because of the leakage of power from subcarriers nearby. Assume that the only adjacent subcarriers cause power leakage. Let $P_{leak}$ be the probability of the spectral leakage. Then the probability that a certain bit is set to "1" because of the spectral leakage is $$\frac{2hP_{leak}}{m}.$$

Remind that each of our hash functions selects one bit from each of the non-overlapping subsequences (each subsequence is m/h bits long). The probability that an inside bit—a bit not adjoining to the subsequence boundary—is set to "1" is given as:

$$\frac{h}{m} + \frac{2hP_{leak}}{m} \quad (3)$$

Figure 4:
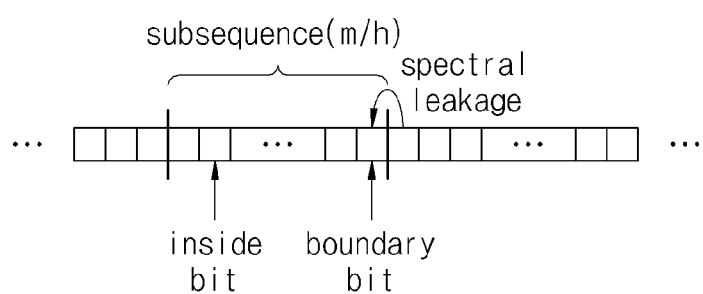
FIG. 4 shows that the spectral leakage by the other hash function can only occur at the boundary of the subsequence.

While consecutive inside bits cannot be selected by two hash functions at the same time, two boundary bits can be set to "1" by two hash functions (FIG. 4). Therefore we have to subtract the probability of the event that two hash functions simultaneously set the bits at the boundary as "1" from the equation (3):

$$\frac{h}{m} + \frac{2hP_{leak}}{m} - \left(\frac{h}{m}\right)^2 P_{leak}(1 + P_{leak}) \quad (4)$$

Combining equation (3) and equation (4), the probability that a certain bit is set to "1" is:

$$P_{positive}^1 = \frac{2\left(\frac{h}{m} + \frac{2hP_{leak}}{m} - \left(\frac{h}{m}\right)^2 P_{leak}(1 + P_{leak})\right)}{\frac{m}{h}} + \frac{\left(\frac{m}{h} - 2\right)\left(\frac{h}{m} + \frac{2hP_{leak}}{m}\right)}{\frac{m}{h}} \quad (5)$$

Then the probability that a certain bit is set to "0" is $1-P_{positive}^1$.

Now we extend to the case of multiple requests onto a subchannel. If there are r requests to a subchannel, the probability that a certain bit is set to "0" is $P_{negative}^r = (1 - P_{positive}^1)^r$, and the probability that a certain bit is set to "1" is $P_{positive}^r = 1 - (1 - P_{positive}^1)^r$. Now consider a STA that does not contend for the subchannel. Even if the STA does not participate in contention, each of its h signature bits has non-negative probability of being "1". The probability that all h bits are "1", which would cause an AP to erroneously claim that a STA has requested for the subchannel, is given as:

$$P_{falsepositive}^{D-Fi} = (P_{positive}^r)^h \quad (6)$$

For the collision probability of D-Fi, it is zero because an AP allocates a subchannel to exactly one STA.

For the comparison purpose, we also analyze the false positive and collision probabilities of the FICA contention mechanism. In FICA, a STA transmits a request signal over one randomly chosen subcarrier within a subchannel. An AP selects one active subcarrier and all the STAs who have sent the signal on that subcarrier are allowed to use the subchannel for the next data transmission. In addition, even if FICA does not suffer from logical false positives, it may wrongly select inactive subcarriers due to the spectral leakage. Therefore, the probability of the false positive in FICA is:

$$P_{falsepositive}^{FICA} = P(A \text{ bit is set to "1" w/ spectral leakage}) - \quad (7)$$
$$P(A \text{ bit is set to "1" w/o spectral leakage})$$
$$= \left(1 - \left(1 - \left(\frac{1}{m} + \frac{2P_{leak}}{m}\right)\right)^r\right) - \left(1 - \left(1 - \frac{1}{m}\right)^r\right)$$

Since a collision occurs only when two or more STAs send their request signals on the same subcarrier, the collision probability in FICA is:

$$P_{collision}^{FICA} = 1 - \left(1 - \frac{1}{m}\right)^{r-1} \quad (8)$$

A. Remarks

Figure 5:
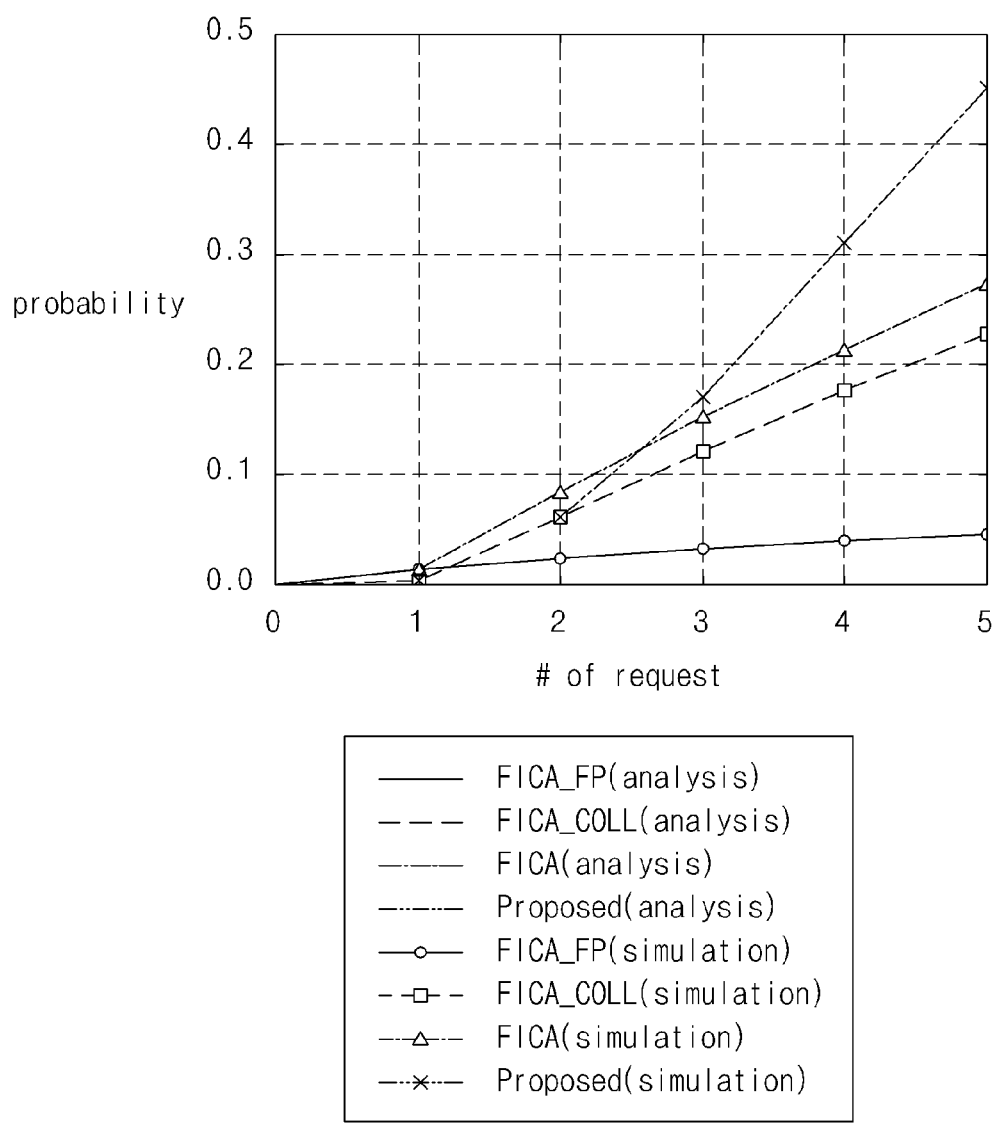
FIG. 5 shows the analysis and simulation results: the false positive and the collision probability of D-Fi and FICA.

To validate our analysis, we have performed simple simulations. FIG. 5 shows the analysis and simulation results: the false positive and the collision probability of D-Fi and FICA. We have used 0.1 for the probability of the spectral leakage, $P_{leak}$. As anticipated, the false positive rate is significant when the number of requests for a subchannel is large. The D-Fi's signature based contention mechanism performs better than FICA's when the number of requests is less than 2.6; its collision probability and false positive probability are smaller than those of FICA. Even so, it is important to control the number of requests for a subchannel. In order to make the number of requests for a subchannel operate within an appropriate range, we propose a multi channel backoff method. Our multi-channel backoff method enables a STA to explore frequency diversity distributively while controlling the number of requests to a subchannel.

B. Multi Channel Backoff

We propose a multi-channel backoff method that distributively controls the number of subchannels a STA requests. Each STA maintains a vector, [Pr(1), Pr(2), ..., Pr(C)] where Pr(i) is how likely a STA requests for a channel i. Initially all Pr(i) are set to be K/C. Based on the results of contention, we adjust Pr(·) according to the additive increase/multiplicative decrease (AIMD) manner. After hearing a CRP frame, a STA knows whether it is selected to use a subchannel or not. For each selected subchannel i, the STA increases the value of Pr(i) by. And for each non-selected subchannel i, the STA decreases the value of Pr(i) by multiplying it with 1/β. Afterwards Pr(·) is normalized in order that their sum is to be K.

Figures 6, 7:
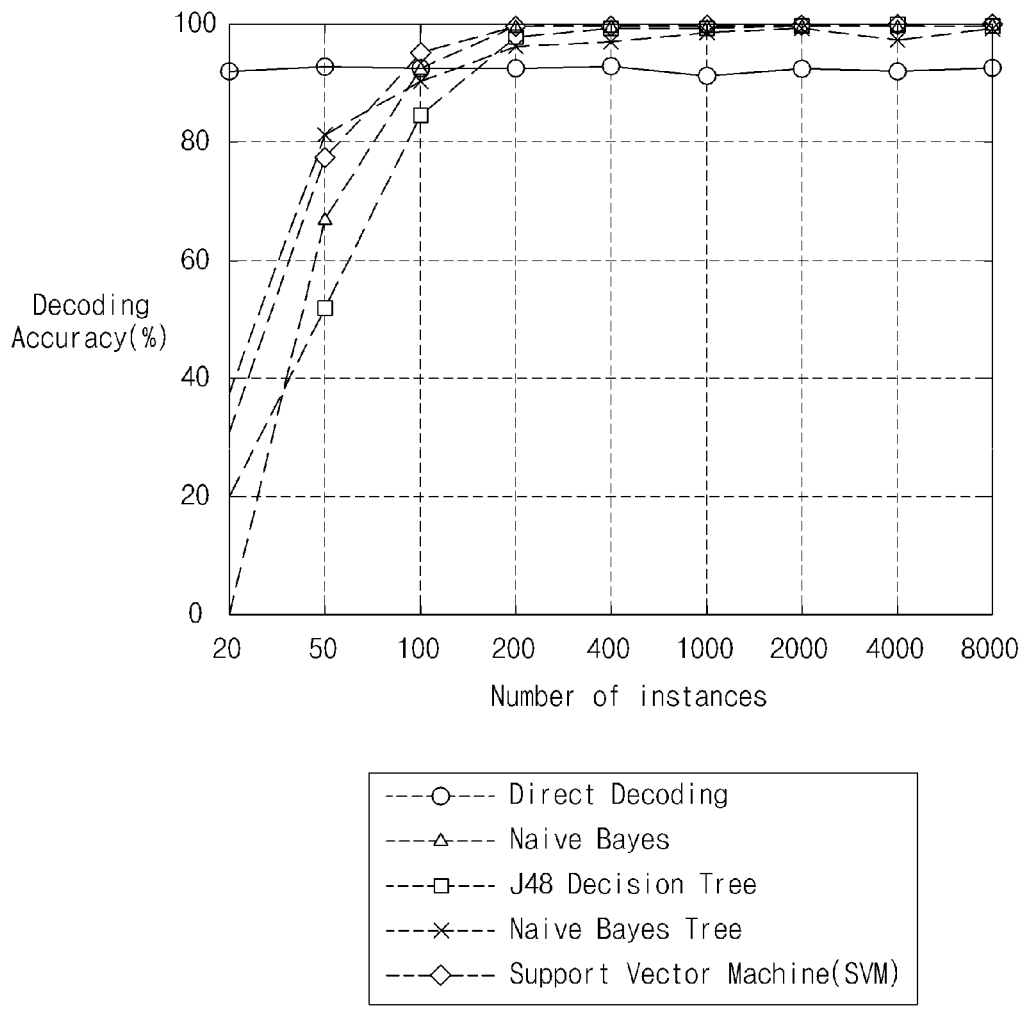
FIG. 6 is an algorithm showing the pseudo-code of the multi channel backoff algorithm.
FIG. 7 shows the accuracy for the CRQ decoding with the ML algorithms.

FIG. 6 is an algorithm showing the pseudo-code of the multi channel backoff algorithm.

On average, a STA requests K subchannels. Obviously, the optimal value of K depends on the number of active STAs (N) in a network. An AP estimates the number of active STAs in the network [20] and periodically broadcasts an appropriate $$K\left(=\frac{r \times C}{N}\right)$$

value. We adjust r such that the false positive probability is not large (e.g., 10%) based on the analysis shown in section III.

One might argue that this multi-channel backoff mechanism cannot accommodate many STAs due to the high false positive probabilities. However, as we will see in the section IV, applying machine learning algorithms further eliminates the false positive probabilities and this allows D-Fi to accommodate many STAs (tens of STAs).

IV. Enhancement: Machine Learning

The multi-channel backoff controls to distribute requests over subchannels. However D-Fi still suffers from nonnegligible false positives. We apply machine learning (ML) methods to further reduce the false positive probabilities.

To apply an ML method to the CRQ decoding process, we collect the dataset consisting of per-subcarrier RSSI readings. In our experiment, we assume that the maximum number of requests to a subchannel is three. We refer to a single set of 16 per-subcarrier RSSI readings as an instance. Since we know the STAs transmitting a CRQ frame in advance we can put a label (i.e., a list of the STAs transmitting a CRQ frame) on each instance. We can use this labeled set of instances to establish the ground truth. Now, we apply a supervised ML method to this set. Specifically, we train an ML model using this set of labeled instances and evaluate the trained ML model with the ground truth. ML models are evaluated with the crossvalidation method provided by WEKA (WEKA tool. http://www.cs.waikato.ac.nz/ml/weka/).

Figure 8:
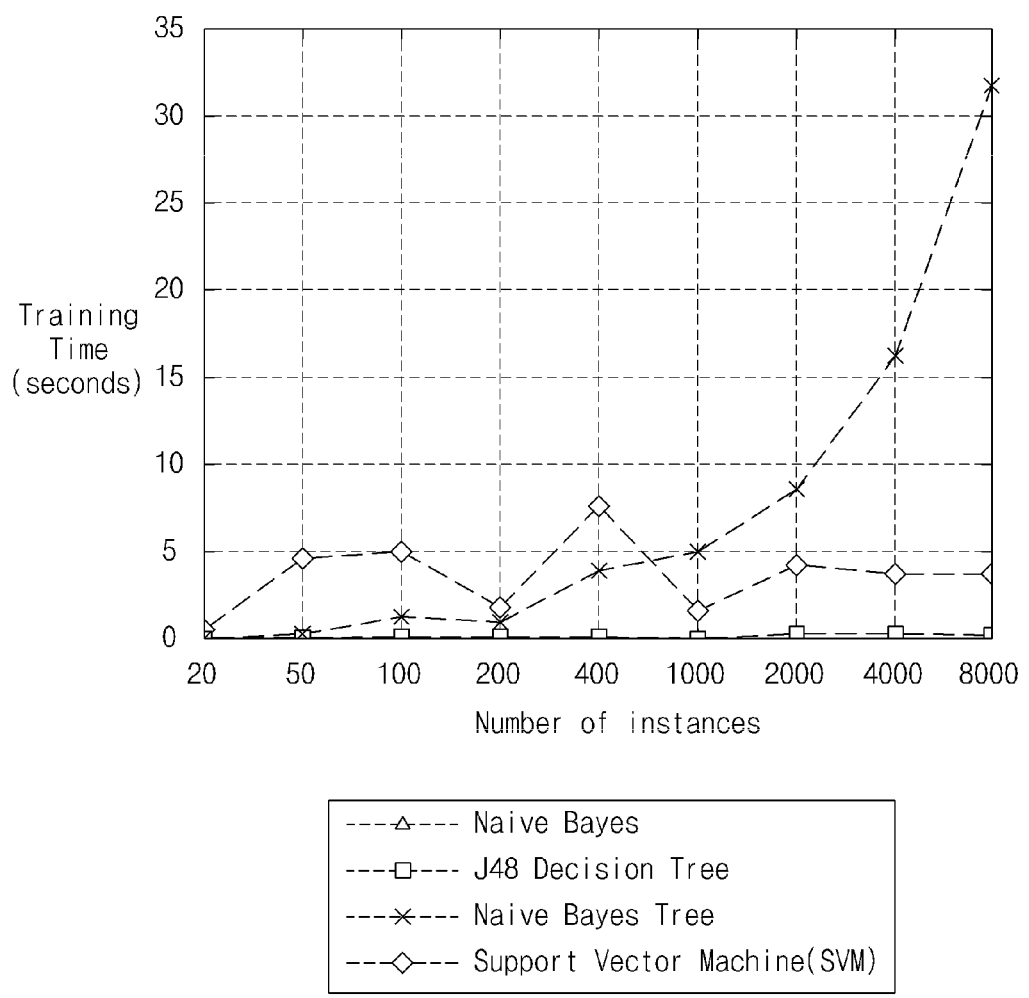
FIG. 8 shows the training time for ML models used for the CRQ decoding.

To visualize the CRQ decoding performance with the ML methods, in FIG. 7 we plot the accuracy of various ML algorithms. The applied algorithms are Naive Bayes, Naive Bayesian tree, J48 (C4.5) decision tree, and support vector machine (SVM). Naive Bayes and Naive Bayesian tree are generally known as simple and fast algorithms. And J48 tree and SVM are highly accurate although they are the results obtained from the area of an Internet traffic classification research. As shown in FIG. 7, all ML algorithms significantly outperform the direct CRQ decoding method (i.e., the method using the Bloom filter only) when the number of training instances is greater than 200. With sufficient training, ML algorithms correct the CRQ decoding errors almost completely (99.9% accuracy). FIG. 8 shows the time required to train an ML model. The Naive Bayes algorithm, generally known as the simplest one, requires only tens of microseconds to be trained due to its low complexity. Moreover, an AP will take hundreds of milliseconds to collect 200 instances which are revealed to be sufficient to train a robust ML model. We next discuss several issues arisen when we apply ML methods to a real WLAN.

A. Getting The Set of Labeled Instances in a Real WLAN

To establish ground truth in a real WLAN, an AP has no choice but to label an instance through the direct CRQ decoding process. Then the false positives may happen and a subchannel can be assigned to a STA who actually does not request the subchannel. However the STA will not use the subchannel for the data transmission and the AP can infer the occurrence of a false positive and correct the label. Although it is hard for an AP to get the complete set of the labeled instances in a real WLAN, we believe that this corrected set of the instances will suffice to perform CRQ decoding robustly.

B. When an AP should train ML models?

To train a ML model, an AP needs a set consisting of at least 200 labeled instances, and this set must be evenly distributed over all possible labels. Note that our multi channel backoff algorithm tries to distribute requests evenly over all subchannels. Once trained, if no significant channel fluctuations exist, an ML model produces an accurate CRQ decoding output. We should re-train the ML model when a training set is outdated.

V. Performance Evaluation

A. Implementation

1) D-Fi Prototype and Experiment Setup:

We implemented the D-Fi OFDM-based PHY/MAC on a small testbed of 4 USRPs and GNU Software Define Radio (SDR). We adopt a simple Binary Amplitude Modulation (BAM) to modulate each bit of a signature used for a CRQ/CRP frame. In order to minimize the false positive of the subcarrierlevel signal detection, the threshold used for the signal power level comparison is adaptively configured. Our experiment is conducted within a laboratory to show the feasibility of the DFi PHY/MAC protocol in a typical indoor wireless scenario.

Figure 9:
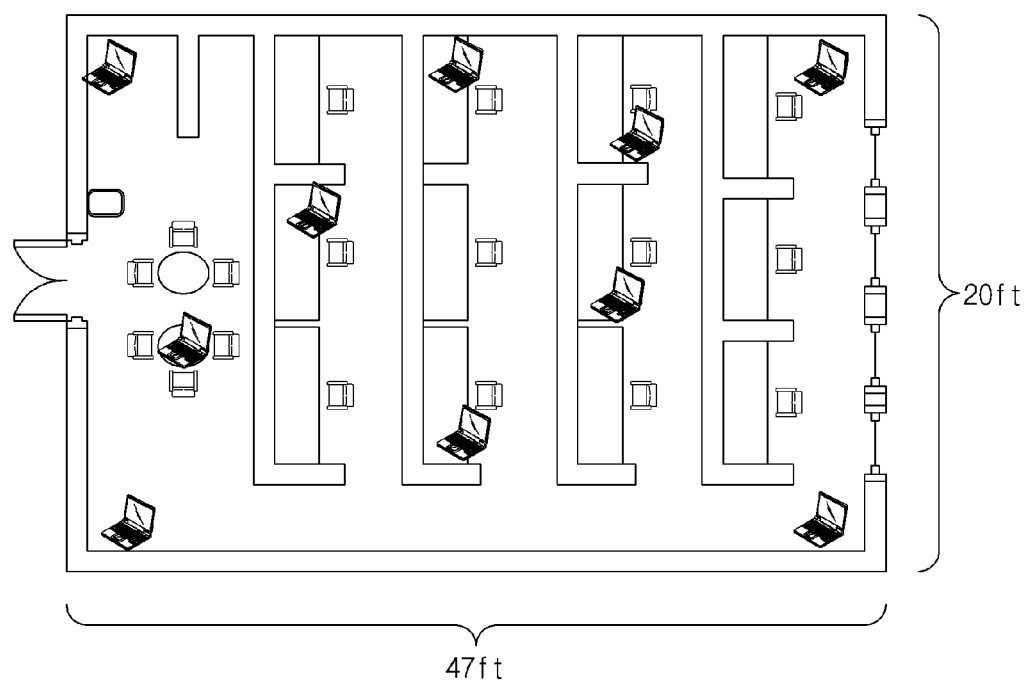
FIG. 9 depicts the topology used in the experiment according to an exemplary embodiment of the present invention.

We depict the topology used in our experiment in FIG. 9. In FIG. 9, we have chosen four positions randomly, and let one node serve as an AP and the other three nodes be STAs associated with the AP. A rich set of the TX powers provided by the SDR is used, resulting in the 10 dB difference between the min and max received signal strengths.

Figure 10:
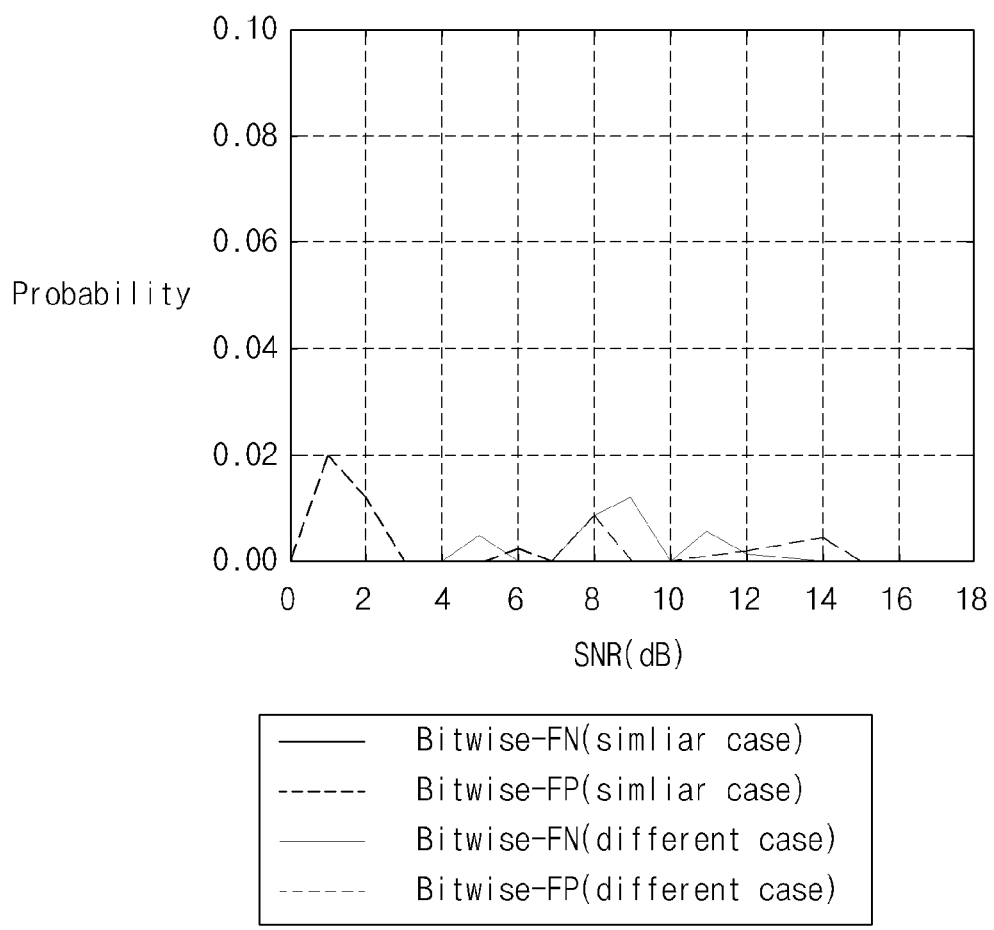
FIG. 10 shows the accuracy of the subcarrier-level signal detection.

2) Results:

FIG. 10 shows the feasibility of the OFDM subcarrier-level signaling. Since we have used three STAs for transmitting a CRQ symbol, multiple CRQ symbols combine at a receiver. The sum SNR of this synthesized CRQ symbol is plotted along the x-axis. We call the case that the signal strength difference among the individual CRQ symbols is smaller than 5 dB "similar case", and otherwise "different case". In the whole range of our experiment setups, the DFi's subcarrier-level signaling performs reliably. Occasional bitwise-FP and bitwise-FN may still happen, however, as we have shown in section IV, D-Fi successfully handles such occurrences with the ML algorithms. When this signature-level signal detection is applied to the CRQ decoding process, the accuracy of about 92% is achieved without the ML algorithms because of the logical errors. Applying the ML methods, however, the CRQ decoding process almost completely eliminates the logical errors and achieves the accuracy of about 99.9%.

We next show the accuracy of our channel estimation method. As shown in FIG. 3, for most of the cases (90%), the estimation error is less than or equal to 1 dB. These two results show that the D-Fi's channel contention and estimation mechanisms are practically feasible in typical indoor environments where a WLAN operates.

B. Trace-Driven Simulation

1) Simulation Setup:

The above D-Fi prototype on the USRP is suitable for demonstrating the feasibility of the Bloom filter based channel contention and estimation method, but not the diversity exploration/exploitation performance of D-Fi. Since an USRP relies on software to process a signal, it experiences difficulty in processing a wide-band (20 MHz) signal. Additionally, the supported data rate is not as high as that in hardware radios at a current development stage of an USRP. Therefore, we resort to trace-driven simulations to assess the diversity performance of D-Fi.

To conduct high fidelity emulation of real world setting, we have used the 802.11n data traces provided by the authors Harnessing Frequency Diversity in Multicarrier Wireless Networks. In ACM MobiCom 2011 (A. Bhartia, Y. C. Chen, S. Rallapalli, and L. Qiu). The traces are obtained from commodity Intel Wi-Fi Link 5300 NIC and its modified driver. The traces contain per-subcarrier (30 subcarriers for 20 MHz) RSSI readings for both the 24 mobile and 30 static diverse links. With the 54 diverse links, we have set up to 50 nodes in our simulations.

We compare the diversity exploration/exploitation performance of 802.11n, FICA, Carrier-by-Carrier in turn algorithm (C-by-C), FARA, D-Fi, and the throughput optimal unit. For a fair comparison, we have modified Cby-C and FARA to use a subchannel as an access basis. For diversity-aware schemes such as C-by-C and FARA, we consider the same amount of the MAC protocol overhead with D-Fi to compare the performance due to the diversity exploitation capabilities. Multi channel backoff parameters for D-Fi (i.e., $\alpha$ and $\beta$) have been fine-tuned to assess the best performance of D-Fi.

Figure 11:
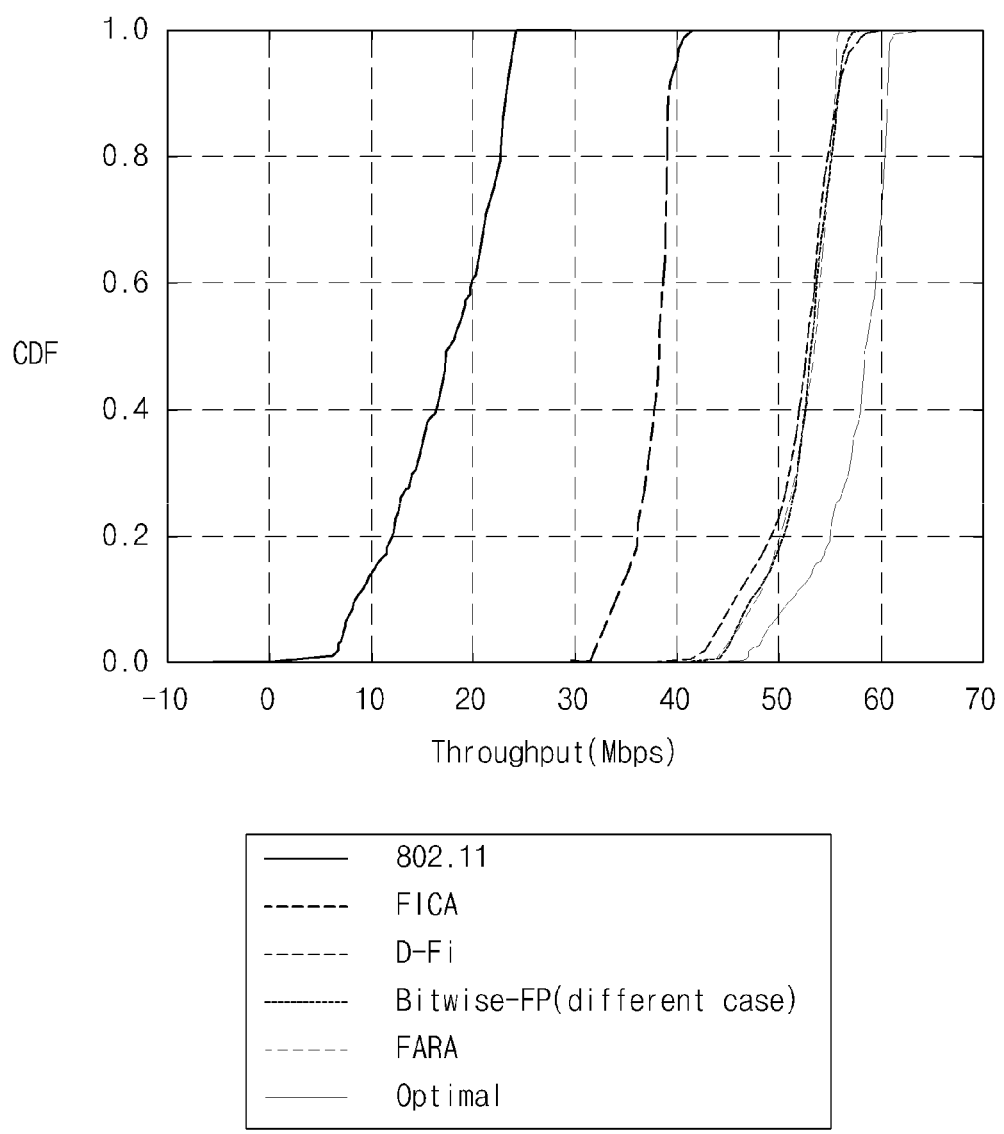
FIG. 11 is the simulation results: the empirical CDF of the throughput for each scheme.

2) Results:

We first show the D-Fi's overall throughput against the other schemes. FIG. 10 presents the empirical cumulative distribution function (ECDF) of the throughput for each scheme. The D-Fi's throughput gains over legacy 802.11n and FICA are 3× and 1.5×, respectively. Because the 802.11n scheme does not channelize a 20 MHz band and uses random access, it neither reduces the MAC overhead nor exploits the diversity. FICA, which uses the channelized random access, reduces the MAC overhead but fails to exploit the diversity. Now, let us compare the D-Fi's diversity exploration/exploitation performance with the other diversity-aware schemes in terms of throughput. Even though the proposed multi channel backoff algorithm requests only a subset of all the subchannels, the D-Fi's diversity exploitation/exploration performance is equivalent to those of the other diversity-aware schemes as shown in FIG. 11.

Figure 12:
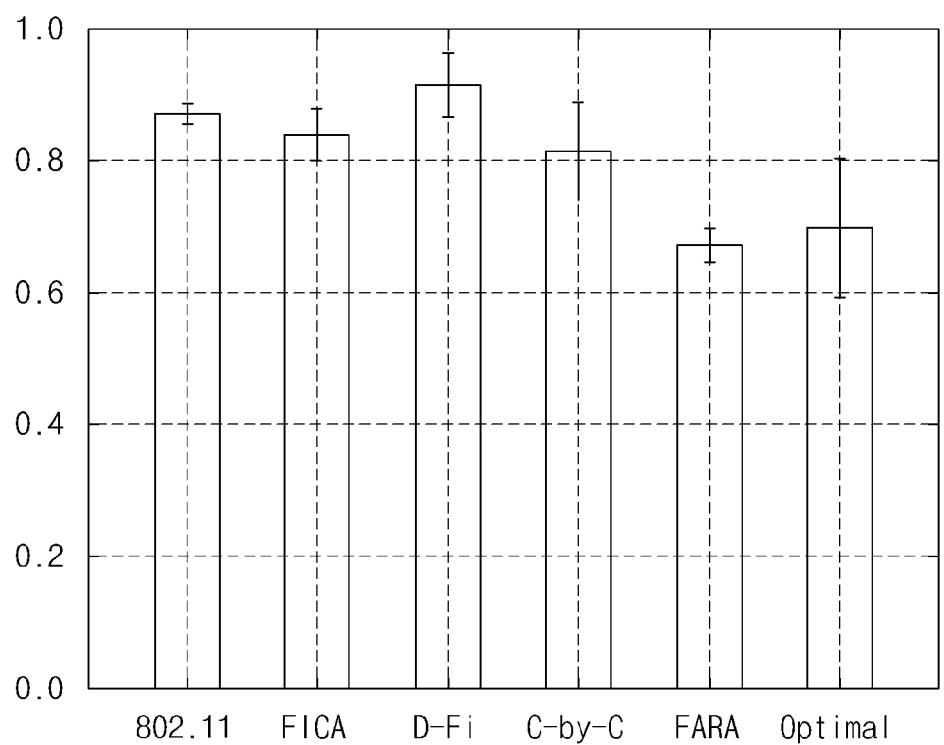
FIG. 12 is the simulation results which shows Jain's fairness index.

We next show the D-Fi's fairness performance. Since DFi allocates a subchannel based on the proportional fairness algorithm, it is expected to be fair as in random access schemes like 802.11n or FICA. To verify that, we compute Jain's fairness index with the throughput obtained by each STA. FIG. 12 presents the fairness index with all the schemes described above. It clearly shows that D-Fi offers high throughput while maintaining fairness comparable to random access schemes like 802.11n and FICA A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for providing WLAN service by an access point (AP) in a WLAN system including the AP and a plurality of stations (STAs) each of which can associate with the AP, the method comprising:
   dividing frequency bandwidth of available channel into a plurality of frequency-selective subchannels;
   receiving, from at least some STAs (first STAs) among the plurality of STAs, CRQ (Contention Resolution reQuest) frame including a signature of the first STAs through at least some of the subchannels, the signature identifying the first STAs;
   identifying the first STAs using the received CRQ frame;
   estimating uplink channel quality of the first STAs using the received CRQ frame;
   allocating the subchannels for the first STAs; and
   broadcasting result of the subchannel allocation using CRP (Contention Resolution rePly) frame.

2. The method of claim 1, wherein each subchannel has a bandwidth equal to or less than minimum coherence bandwidth.

3. The method of claim 1, wherein each subchannel has a bandwidth equal to or less than 3 MHz.

4. The method of claim 3, wherein the number of the subchannels is 14.

5. The method of claim 1, wherein:
   the signature is a binary bit sequence of 16 bits; and
   each of the STAs receives a unique signature at the time of association with the AP.

6. The method of claim 1, wherein the AP receives synthesized signal of the signature of the first STAs trying to use the subchannels for each subchannel.

7. The method of claim 1, wherein the signature is modulated on K (K is a natural number) subchannels selected by each of the first STAs according to likelihood of good channel quality.

8. The method of claim 7, wherein each of the first STAs selects the subchannels using the following algorithm 1.

---
Algorithm 1 Multi channel backoff
---
for i := requested subchannel i ∈ C do
   if subchannel i is requested & allocated then
      $Pr(i) \leftarrow Pr(i) + \alpha$
   else if subchannel i is requested & not allocated then
      $Pr(i) \leftarrow Pr(i)/\beta$
   end if
end for
$Pr(i) \leftarrow Pr(i) \times \frac{K}{\sum_{j \in C} Pr(j)}, \forall i \in C$

---

9. The method of claim 1, wherein the AP identifies the first STAs using a Bloom filter.

10. The method of claim 9, wherein the Bloom filter is implemented through subcarrier-level signaling in OFDM system.

11. The method of claim 1, wherein the AP estimates the uplink channel quality by measuring energy of a unique bit, which is transmitted by one STA only, included in the received CRQ frame.

12. The method of claim 1, wherein the broadcasting is broadcasting the CRP frame including data rate information.

13. The method of claim 1, wherein the AP identifies the first STAs using Machine Learning (ML) algorithm.

14. The method of claim 13, wherein an ML model used in the ML algorithm is trained when a STA joins or leaves the AP.

15. A WLAN system comprising:
   an access point (AP); and
   a plurality of stations (STAs) each of which can associate with the AP, wherein
   a channel available in the WLAN system is divided into a plurality of frequency-selective subchannels;
   at least some STAs (first STAs) among the plurality of STAs transmit a CRQ (Contention Resolution reQuest) frame including a signature of the first STAs through at least some of the subchannels, the signature identifying the first STAs; and
   the AP identifies the first STAs using the received CRQ frame, estimates uplink channel quality of the first STAs using the received CRQ frame, allocates the subchannels for the first STAs, and broadcasts result of the subchannel allocation using CRP (Contention Resolution rePly) frame.

16. The WLAN system of claim 15, wherein the first STAs transmit the CRQ frames simultaneously when the channel is idle for more than DIFS (DCF Inter-Frame Space).

\* \* \* \* \*